United States Patent
Whitaker

(10) Patent No.: US 6,301,848 B1
(45) Date of Patent: Oct. 16, 2001

(54) GARAGE FLOOR COVERING WITH FRONT AND SIDE PANELS

(76) Inventor: Ivan A. Whitaker, 95 Liberty St., Apt. B-4, Stamford, CT (US) 06902

( * ) Notice: Subject to any disclaimer, the term of this patent is extended or adjusted under 35 U.S.C. 154(b) by 0 days.

(21) Appl. No.: 09/650,564

(22) Filed: Aug. 30, 2000

(51) Int. Cl.[7] .............................. E04B 1/70; E04F 17/00
(52) U.S. Cl. ......................... 52/302.1; 296/38; 184/106
(58) Field of Search .................... 52/302.1; 296/38; 184/106

(56) References Cited

U.S. PATENT DOCUMENTS

| | | | |
|---|---|---|---|
| D. 329,996 | 10/1992 | Ciszweski | D12/153 |
| 4,246,982 | * 1/1981 | Pretnick | 184/106 |
| 4,671,024 | 6/1987 | Schumacher | 52/2 |
| 5,308,670 | 5/1994 | Saylor | 428/81 |
| 5,556,692 | * 9/1996 | Zheng | 428/156 |
| 5,816,743 | 10/1998 | Schmitz, Jr. | 405/53 |
| 6,061,993 | * 5/2000 | Bendizen | 52/783.19 |

* cited by examiner

Primary Examiner—Carl D. Friedman
Assistant Examiner—Chi Nguyen
(74) Attorney, Agent, or Firm—Rudolf O. Siegesmund

(57) ABSTRACT

A garage floor covering comprising a floor, a base, two stops, a trough, and front and side panels. The floor is fixedly and removably engaged to a base. The base is inclined having a first end higher than a second end. The base has a trough for carrying off water and an inclined ramp leading onto the base. The base is made of a honey-comb geometric structure to provide a lightweight base capable of supporting a vehicle. The trough accepts a standard hose attachment at an outside exit of the trough. The floor of the platform has a raised textured pattern to provide traction and to channel water flow toward the trough. Stops are fixedly and removably engaged to the floor so that the automobile will be prevented from driving off the platform or striking the wall of the garage. The wedges may be positioned to stop the vehicle at a desired position and the position of the wedges may be changed for different vehicles. Panels may be attached to the platform and to the walls of the garage so that the vehicle can be washed inside the garage.

10 Claims, 5 Drawing Sheets

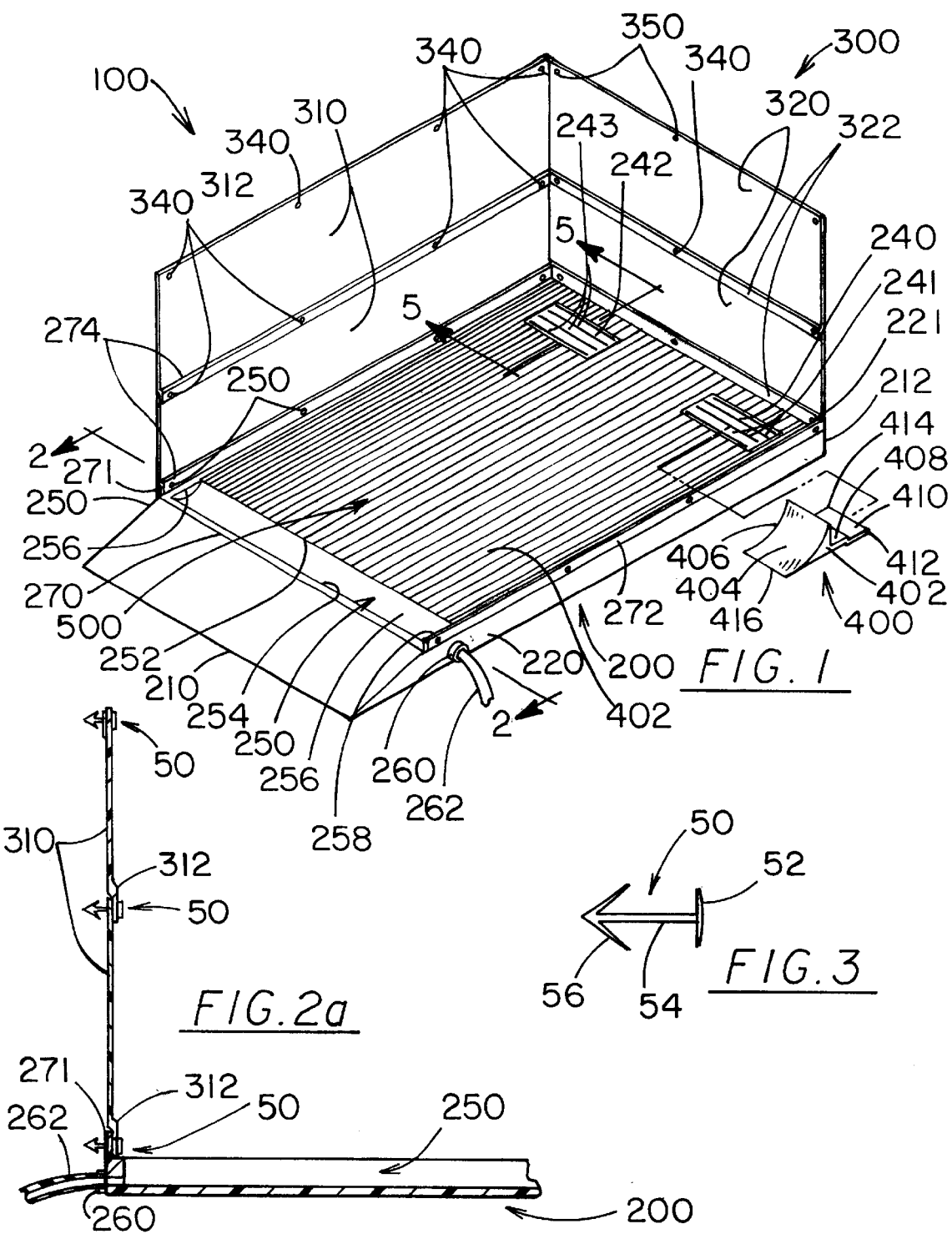

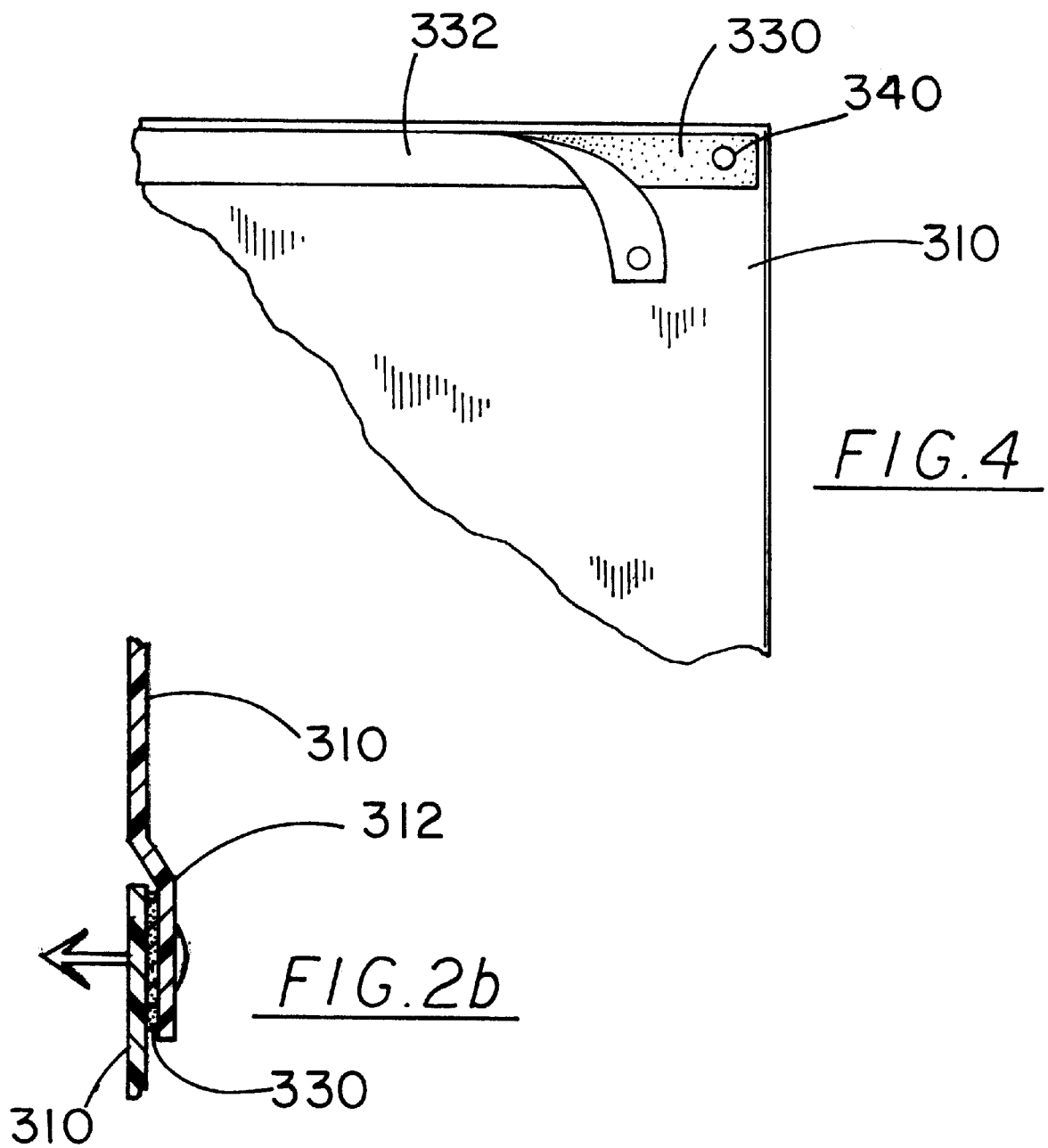

US 6,301,848 B1

GARAGE FLOOR COVERING WITH FRONT AND SIDE PANELS

BACKGROUND OF THE INVENTION

1. Field of the Invention

The present invention relates to an apparatus for covering a garage floor and in particular to a garage floor covering with drainage and front and side panels to catch water during washing of the vehicle.

2. Description of the Prior Arts

U.S. Pat. No. 5,816,743 discloses a portable containment apparatus to collect run-off water after washing a vehicle and a sump pump to carry the water to a collection container. U.S. Pat. No. 5,308,670 discloses a vinyl pad with raised edges to be placed beneath a vehicle. U.S. Pat. No. 4,671,024 discloses a plastic sheet with raised edges to collect fluids from vehicle. U.S. Pat. No. 4,246,982 discloses a car ramp and drip pan. European Patent Application EP 0 161 676 A3 discloses a shallow collecting tank placed beneath a vehicle. What is needed beyond the prior art is a lightweight and relatively inexpensive system for covering the floor of a garage that allows the vehicle to be driven up off the floor so that a drain can carry off fluids. What is further needed beyond the prior art is a floor covering system that can also protect the garage walls while washing the vehicle and capture the water, cleaning fluids and splatter from the automobile and carry the runoff to the drain in the system.

SUMMARY OF THE INVENTION

The present invention meets the needs and solves the problems identified above by providing a garage floor covering comprising a floor, a base, two stops, a trough, and front and side panels. The floor is fixedly and removably engaged to a base. The base is inclined having a first end higher than a second end. The base has a trough for carrying off water and an inclined ramp leading onto the base. The base is made of a honey-comb geometric structure to provide a lightweight base capable of supporting a vehicle. The trough accepts a standard hose attachment at an outside exit of the trough. The floor of the platform has a raised textured pattern to provide traction and to channel water flow toward the trough. Stops are fixedly and removably engaged to the floor so that the automobile will be prevented from driving off the platform or striking the wall of the garage. The wedges may be positioned to stop the vehicle at a desired position and the position of the wedges may be changed for different vehicles. Panels may be attached to the platform and to the walls of the garage so that the vehicle can be washed inside the garage.

The foregoing and other objects, features and advantages of the invention will be apparent from the following more particular description of a preferred embodiment of the invention, as illustrated in the accompanying drawings wherein like reference numbers represent like parts of the invention.

BRIEF DESCRIPTION OF THE DRAWINGS

FIG. 1 is a right perspective view of the garage floor covering.

FIG. 2a is a cross sectional view along line 2—2 of FIG. 1.

FIG. 2b is a detail view of an adhesive joint between panels

FIG. 3 is a detail view of a lock in pin.

FIG. 4 is detail view of an adhesive strip.

DESCRIPTION OF PREFERRED EMBODIMENTS

Figure 5:
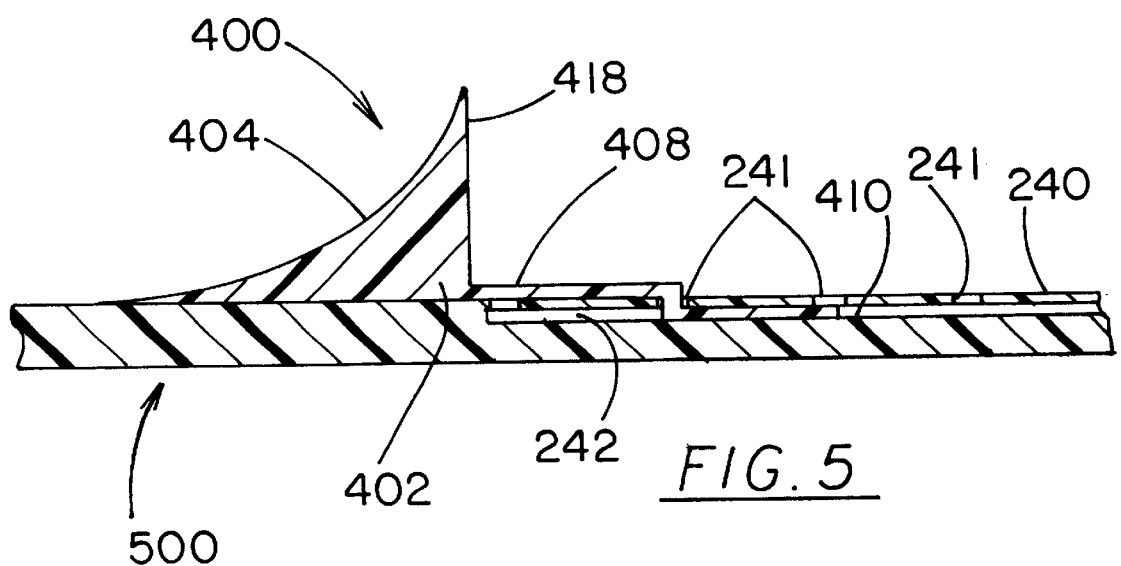
FIG. 5 is a cross sectional view along line 5—5 of FIG. 1.

In FIG. 1, Garage floor covering 100 is shown having base 200, floor 500, stops 400, trough 250, and panels 300. Base 200 has rear edge 210, forward face 212, right side 220 and left side 230. Trough 250 has trough left side 256, trough right side 260, trough rear edge 252 and trough forward edge 254. Trough interior surface 256 is curved so that the center line of trough interior surface 256 is the lowest point in trough 250 from trough rear edge 252 and trough forward edge 254. Water or other liquids entering trough 250 will drain out of trough 250 through exit 260 and hose 262. Forward face 212 is higher than trough rear edge 252 so that water or other liquids will run down floor 500 into trough 250. Additionally, trough right side 260 is slightly larger than trough left side 256 so that trough interior surface 256 inclines from left to right in order to increase the flow of water or other liquids toward exit 260 and hose 262. Base 200 angles downward at breaking 270 to base rear edge 210. The inclined plane formed from base rear edge 210 to breaking 270 provides a ramp that allows a vehicle to be driven onto base 200 and floor 500. Floor 500 is a flexible surface that is laid over base 200. Floor 500 has left insert section 242 and right insert section 240. Left insert section 242 has a plurality of left insert section slots 243 for receiving a stop 400. Right insert section 240 has a plurality of right insert section slots 241 for receiving a stop 400. Stop 400 is an interchangeable part which can be inserted into either left insert section 242 or right insert section 240. In the preferred embodiment of garage floor covering 100, one stop 400 is inserted into left insert section 242 and another stop 400 is inserted into right insert section 240. Panels 300 are designed for attachment to base 200 and to the walls of the garage into which garage floor covering 100 is installed. Panels 300 consist of two front panels 320 and two side panels 310. Two additional side panels 310 (not shown in FIG. 1) are installed on the right side of base 200 to complete the enclosure. In an alternate embodiment, front panels 320 and side panels 310 are divided into interchangeable sections of uniform size and configuration for assembly into panels 300. Front panels 320 have front panel overlap sections 322 and holes 340 for receiving locking pins 50 (See FIG. 2a and 3). Side panels 310 have side panel overlap sections 312 and holes 340 for receiving locking pins 50 (See FIG. 2a and 3). Base 200 has side panel connectors 272 and 271 for receiving side panels 310. Front panel connector 321 extends upward from forward face 212 for receiving front panel 320.

FIG. 2 shows a cross section along line 202 of FIG. 1. The method of joining side panels 310 to the wall of the garage (not shown) is depicted. The top section 310 overlaps the lower section 310 where side panel overlap section 312 of the top side panel 310 engages the top end of the lower side panel 310. A locking pin 50 is inserted into each of the holes 340 (see FIG. 1) and driven through into the adjacent garage wall. Trough 250 is seen in base 200. In FIG. 2a exit 260 and 262 are shown on the left side of trough 250. Exit 260 and hose 262 may be located on either the right side or the left side of trough 250. FIG. 2b depicts the interlocking of side panels 310. Side panel overlap section 312 fits over the top end of another side panel 310. The top end of one side panel 310 is sealingly engaged to the side panel overlap section 312 by adhesive strip 330 which is located on the top end of side panel 310. Adhesive strip 330 creates a water resistant seal between the two side panels 310. Side panels 310 are always installed with side panel overlap section 312 at the bottom of side panel 310. Correspondingly, front panels 320 interlock in the same manner as side panels 310. Front panel overlap section 322 fits over the top end of another front panel 320. The top end of one front panel 320 is sealingly engaged to the front panel overlap section 322 by adhesive strip 330 which is located on the top end of side panel 320. Adhesive strip 330 creates a water resistant seal between the two front panels 320. Front panels 320 are always installed with front panel overlap section 322 at the bottom of front panel 320.

FIG. 3 depicts locking pin 50. Locking pin 50 has head 52, body 54 and barb 56. To insert locking pin 50, barb 56 is placed in hole 340 and pressure (usually by striking with a hammer) is applied to head 52 forcing barb 56 through hole 340 and into the wall of the garage. When barb 56 penetrates the wall of the garage, locking pin 50 is prevented from coming out of the wall by barb 56 which opens inside the wall and prevents movement of locking pin 50. FIG. 4 depicts adhesive strip 330 affixed to the top end of a side panel 310. Covering 332 can be removed from adhesive strip 330 when panel 310 is to be installed. Hole 340 is shown for receiving locking pin 50.

FIG. 5 shows installation of step 400 into floor 500. Floor 500 is made of suitably durable and flexible material such as natural or artificial rubber. Floor 500 has a raised textured patter to provide traction and to channel water and other liquids toward trough 250. Right insert section 241 is shown with slots 241. Stop 400 has curved wall 404, vertical wall 418, right side 402, first forward step 408 and second forward step 410. Second forward step is parallel to first forward step 408 and is lower than first forward step 408. Second forward step 408 is inserted through a slot 241 in right insert section 240 and slides into receiving space 242 until all of second forward step 408 is inside of receiving space 242. First forward step 408 rests on the surface of right insert section 240 and the rest of stop 400 rests on floor 500. The same procedure applies to insertion of a stop 400 into left insert section 242.

Figure 6:
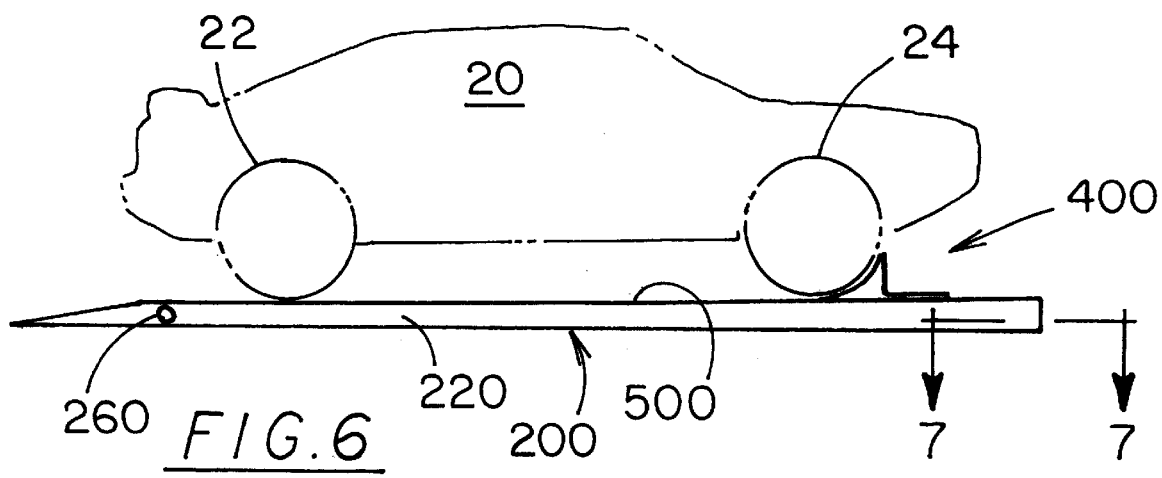
FIG. 6 is a side view of the base.

FIG. 6 shows base 200 with automobile 20 positioned on floor 500 with front wheel 24 engaging stop 400.

Figure 7:
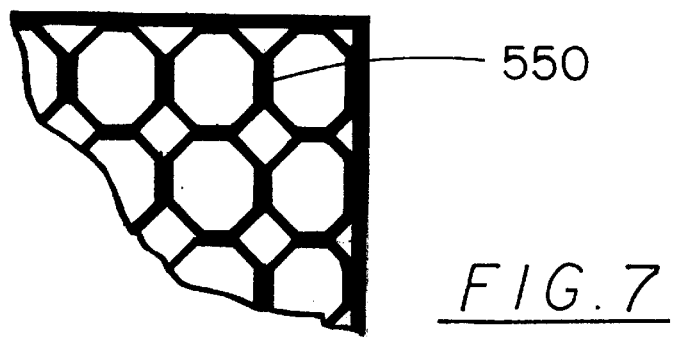
FIG. 7 is a detail view of the interior structure of the base.

FIG. 7 is a detail of the honeycomb structure of base 200 seen along cut line 7—7 of FIG. 6. The honeycomb structure of the interior of base 200 is made up of octagonal sections 550 which fit together as shown and provide the internal structure and rigidity of base 200.

Figure 8:
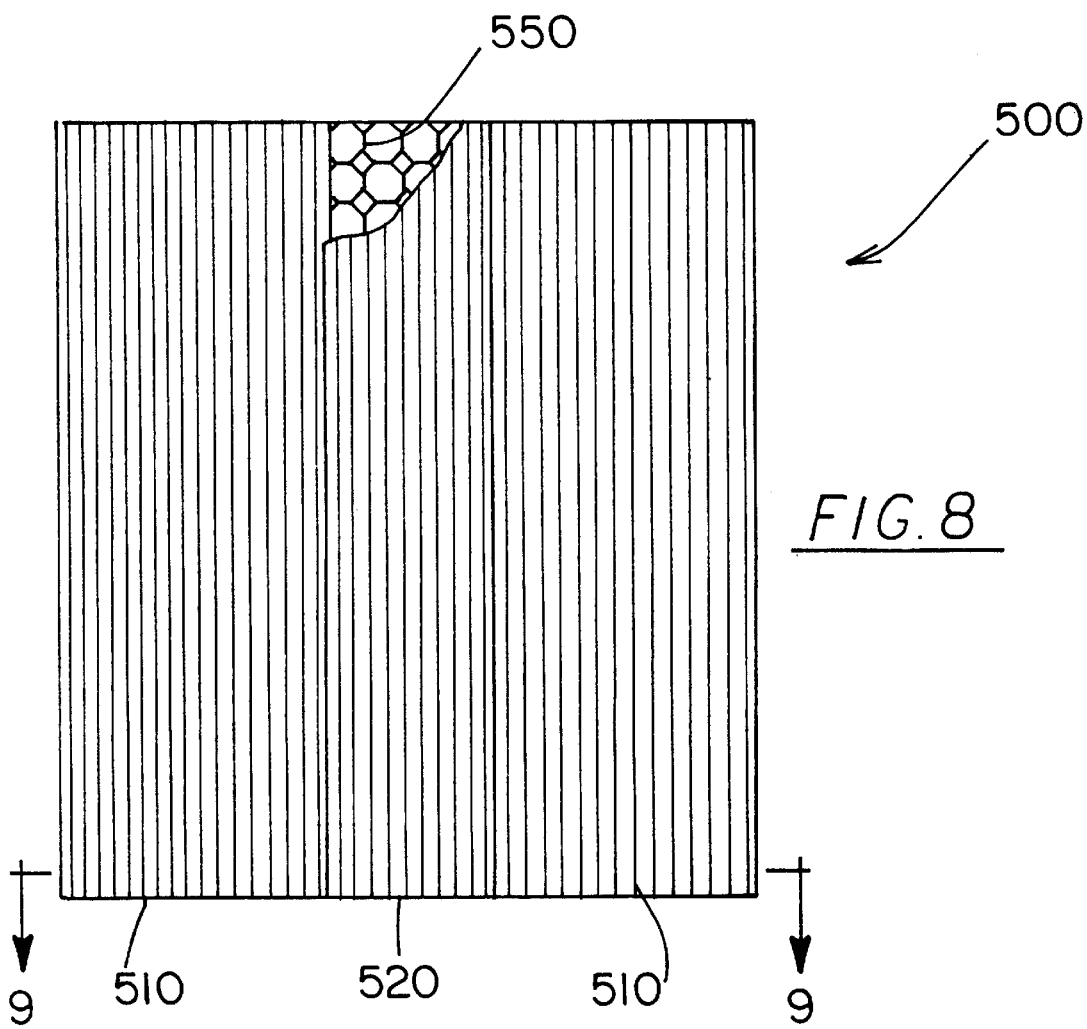
FIG. 8 is a top view of the flooring panel sections.

FIG. 8 depicts the method of installing floor 500. Floor 500 has two floor panel sections 510 and a floor joint section 520. One floor panel section 510 is placed on the right and one floor panel section 510 is placed on the left side of base 200. Floor joint section 520 is placed between the two floor panel sections 510. Floor joint section 520 has a slightly raised head with overlapping wings which fit over the ends of floor panels sections 510 to provide a seal. The honeycomb structure of the interior of base 200 is seen showing octagonal sections 550.

Figure 9:
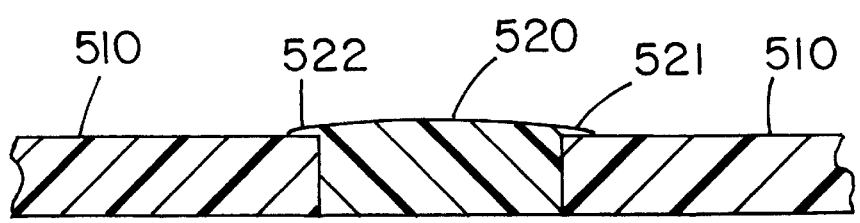
FIG. 9 is a cross sectional view along line 9—9 of FIG. 8.

In FIG. 9 the overlapping function of center joint 520 is shown.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

I claim:

1. A floor and wall covering for a garage comprising:
   a floor fixedly and removably engaged to a base;
   a trough fixedly engaged in said base and said floor;
   at least one exit from said trough;
   at least two side panels and at least two front panels fixedly engaged to said base and to said garage;
   a plurality of locking pins;
   wherein said base has a plurality of side panel connectors for receiving said side panels and a front panel connector for receiving said front panels;
   wherein said side panels are sealingly engaged to each other and to said base by an adhesive strip, a side panel overlap section and a plurality of locking pins; and
   wherein said front panels are sealingly engaged to each other and to the base by an adhesive strip, a front panel overlap section and a plurality of locking pins;
   wherein each of said front panels has a front overlap section and holes for receiving locking pins; wherein each of said side panel sections has a side panel overlap section and holes for receiving locking pins; and
   wherein said locking pins are inserted through said holes for receiving said locking pins and driven into the garage wall, said base, said side panels and said front panels form an enclosure in which a car may be washed inside the garage.

2. The apparatus of claim 1 further comprising a stop fixedly and removably engaged to said floor.

3. The base of claim 1 further comprising a plurality of octagonal sections in a honeycomb configuration.

4. The floor of claim 1 further comprising a first floor panel section, a second floor panel section and a floor joint section; and
   wherein said floor joint section connects said first floor panel section and said second floor panel section by means of interlocking action between a head and a plurality of overlapping wings with said first floor panel section and said second floor panel section.

5. The floor of claim 1 further comprising a textured surface for channeling water and other liquids toward the trough.

6. A floor and wall covering for a garage comprising:
   a floor fixedly and removably engaged to a base;
   a trough fixedly engaged in said base and said floor;
   at least one exit from said trough;
   a stop fixedly and removably engaged to said floor; and
   a plurality of side panels and a plurality of front panels fixedly engaged to said base and to said garage; and
   a first floor panel section, a second floor panel section and a floor joint section;
   wherein said floor joint section connects said first floor panel section and said second floor panel section by means of interlocking action between a head and a plurality of overlapping wings with said first floor panel section and said second floor panel section; and
   wherein said base, said front panels and said side panels form an enclosure in which said vehicle may be washed.

7. The base of claim 6 further comprising a plurality of octagonal sections in a honeycomb configuration.

8. The floor of claim 6 further comprising at least one floor panel section and a floor joint section.

9. The garage floor covering of claim 6 wherein said side panels are sealingly engaged to each other and to said base by an adhesive strip, a side panel overlap section and a plurality of locking pins; and
wherein said front panels are sealingly engaged to each other and to the base by an adhesive strip, a front panel overlap section and a plurality of locking pins.

10. The floor of claim 6 further comprising a textured surface for channeling water and other liquids toward the trough.

\* \* \* \* \*